N. CARPENTER.
HOP PRESS POWER.
No. 73,500. Patented Jan. 21, 1868.
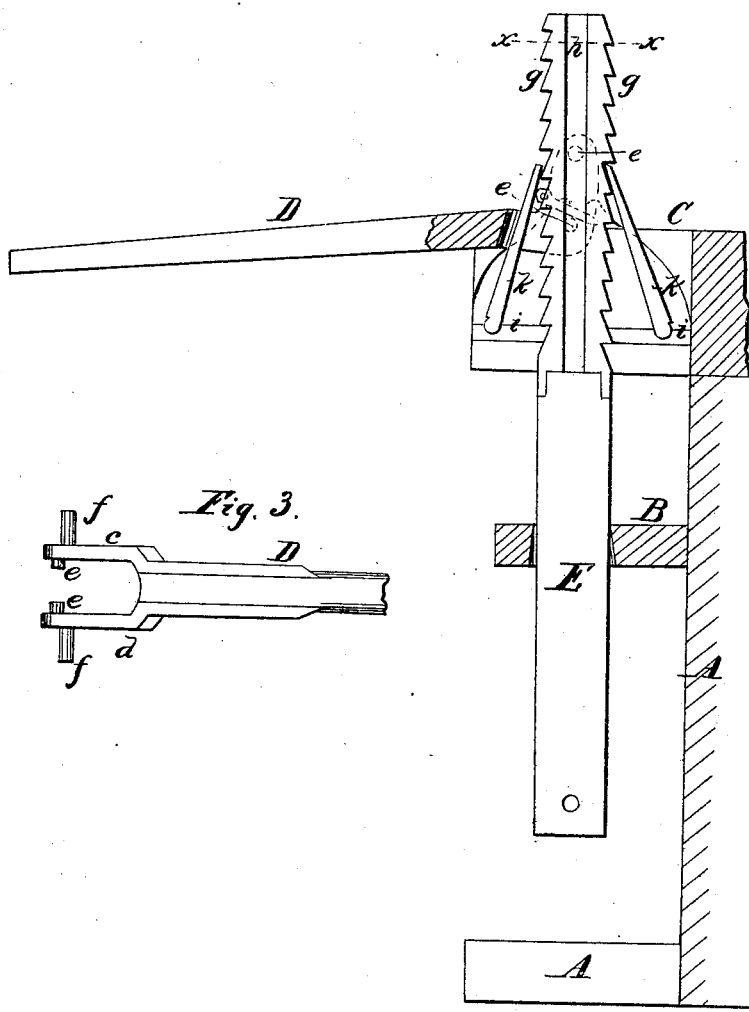
Witnesses:
P. F. Dodge
C. G. Luce
Inventor:
N. Carpenter
by Dodge & Munn
his Attys

United States Patent Office.

NEWEL CARPENTER, OF WHITE CREEK, WISCONSIN

Letters Patent No. 73,500, dated January 21, 1868.

---

IMPROVED HOP-PRESS POWER.

---

*The Schedule referred to in these Letters Patent and making part of the same.*

---

TO ALL WHOM IT MAY CONCERN:

Be it known that I, NEWEL CARPENTER, of White Creek, in the county of Adams, and State of Wisconsin, have invented certain new and useful Improvements in Press-Power; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improvement in press-power, and consists in a novel arrangement of racks, pawls, and a lever, in such a way that hops or similar substances may be readily and easily compressed for baling. In the drawings—

Figure 1 is a longitudinal vertical section.

Figure 2 is a cross-section on the line $x\ x$ of fig. 1.

Figure 3 is a detached view of the end of the lever shown partly in dotted lines in fig. 1.

Figure 4 is a top plan view of that part of the press containing the seats or bearing-plates of the lever and the pawls.

In constructing my press-power, the frame A may be made separately or may form a part of the frame in which the substance to be pressed is placed. To the upright side of the frame, I firmly attach the beams B C, as shown in fig. 1. The beam B, I provide with an opening, and the end of the beam C, I make fork-shaped, as shown in fig. 4, and fasten on either side of the inside of the fork the seats or bearing-plates $a\ b$, as shown in the same figure. The lever D, I make of any desired length, and of suitable strength for the purpose, providing its end with the metallic arms $c\ d$, as shown in figs. 3 and 1, and on either side of the arms $c\ d$ I place the projections or bearings $e\ f$, as shown in the same figure and in dotted lines in fig. 1. In the opening in the beam B, and in the fork of the beam C, I place the movable upright, E, having its upper end provided with the ratchets $g$, as shown in fig. 1. These ratchets $g$ are fastened upon the upright, E, so as to leave a groove, $h$, on its sides, as shown in fig. 1, and more clearly in the cross-section shown in fig. 2. The bearing-plates $a\ b$, I provide with curved seats $i$, in which rest the pawls $k$, which bear upon and catch into the teeth of the ratchets $g$. These bearing-plates $a\ b$ are also provided with seats or sockets $l$, in which the projections $f$ of the lever D rest. These sockets $l$ should be deep enough to admit of the insertion of a pin, $m$, over the projections $f$ for holding them in place. The ratchets $g$ are so placed that the teeth of each may stand midway between the teeth of the other, as shown in fig. 1. The opening in the beam B, I make sufficiently large to permit the upright, E, to move easily in a vertical direction, and also to admit of a slight oscillating motion.

In operating my press-power, I place the lever D in position by dropping the projections $f$ into the sockets $l$, and inserting a pin, $m$, over them, if desired, and by placing the pawls $k$ in place, as shown in fig. 1. I then introduce the upright, E, as shown, when the projections $e$ of the lever D enter the grooves $h$ and the pawls $k$ catch into the teeth of the ratchets $g$. As the line between the projections $e\ f$ on the end of the lever D is nearly at right angles with the length of the lever, the projections $e$ must oscillate as the opposite end of the lever is moved up and down, which, in turn, causes the upright to be moved first one way and then the other. As it moves one way, one of the pawls $k$ catches into the teeth of one of the ratchets, and the upright, E, is raised till the pawl $k$, on the opposite side of the upright, catches into the teeth of the ratchet on that side, and so, by moving the lever D, the upright is constantly moved forward.

It is obvious that this press-power may be applied in any direction desired, or may be readily attached to any framework for convenience in pressing hops or similar substances.

Having thus described my invention, what I claim, is—

The lever D, provided with the lugs $e$, in combination with the bar E, having the grooves $h$ in its sides and the notches $g$ on its edges, with the pawls $k$, all arranged for joint operation, substantially as described.

NEWEL CARPENTER.

Witnesses:
GEO. B. BACON,
H. B. FRINK.